Nov. 29, 1932.        D. R. SPERRY        1,889,225
FILTER PRESS
Filed March 26, 1931        5 Sheets-Sheet 2
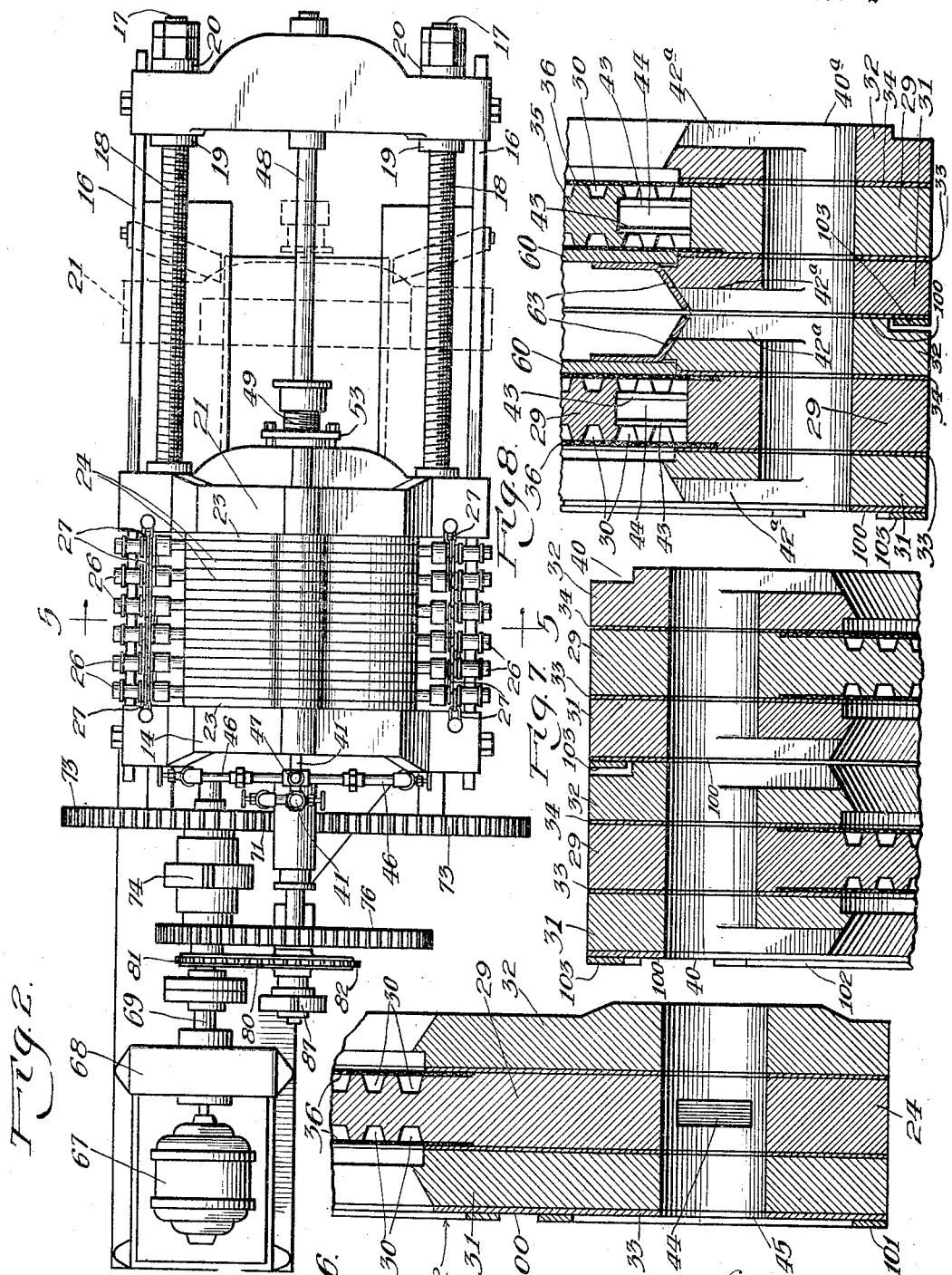
Inventor:
David R. Sperry,
By Dyrenforth, Lee, Chritton & Wiles,
Attys:

Nov. 29, 1932.      D. R. SPERRY      1,889,225
FILTER PRESS
Filed March 26, 1931      5 Sheets-Sheet 3
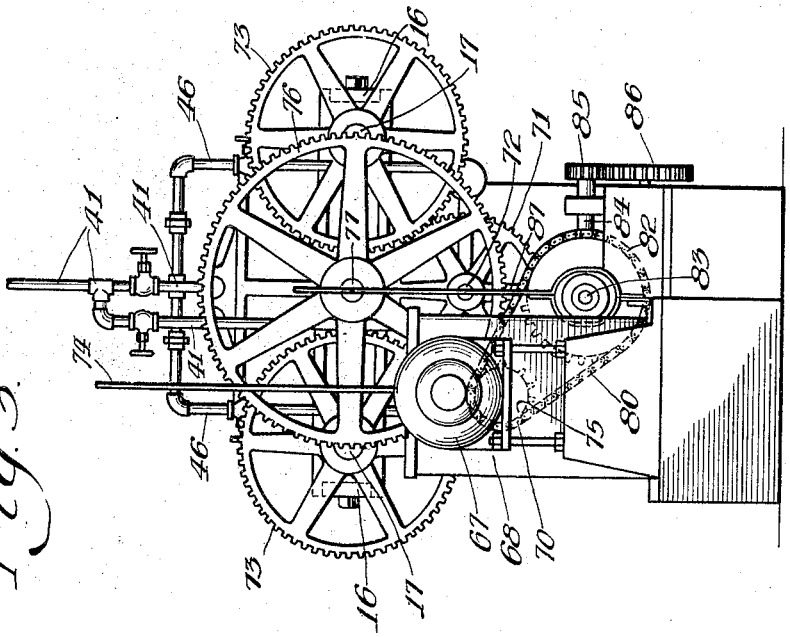
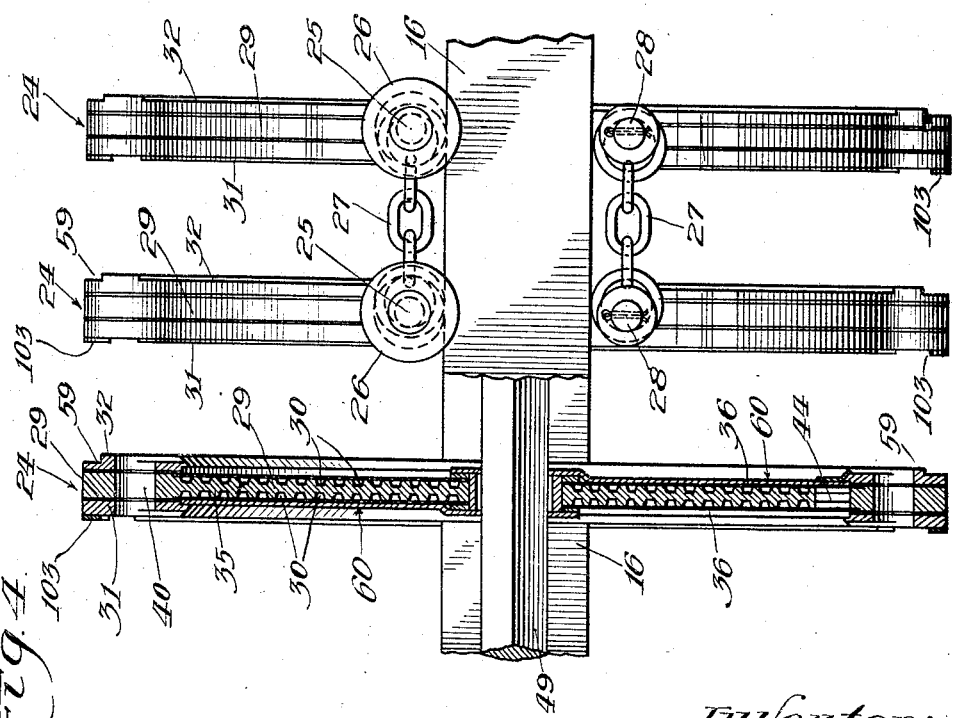
Inventor:
David R. Sperry,
By Dyrenforth, Lee, Chritton & Wiles
Attys.

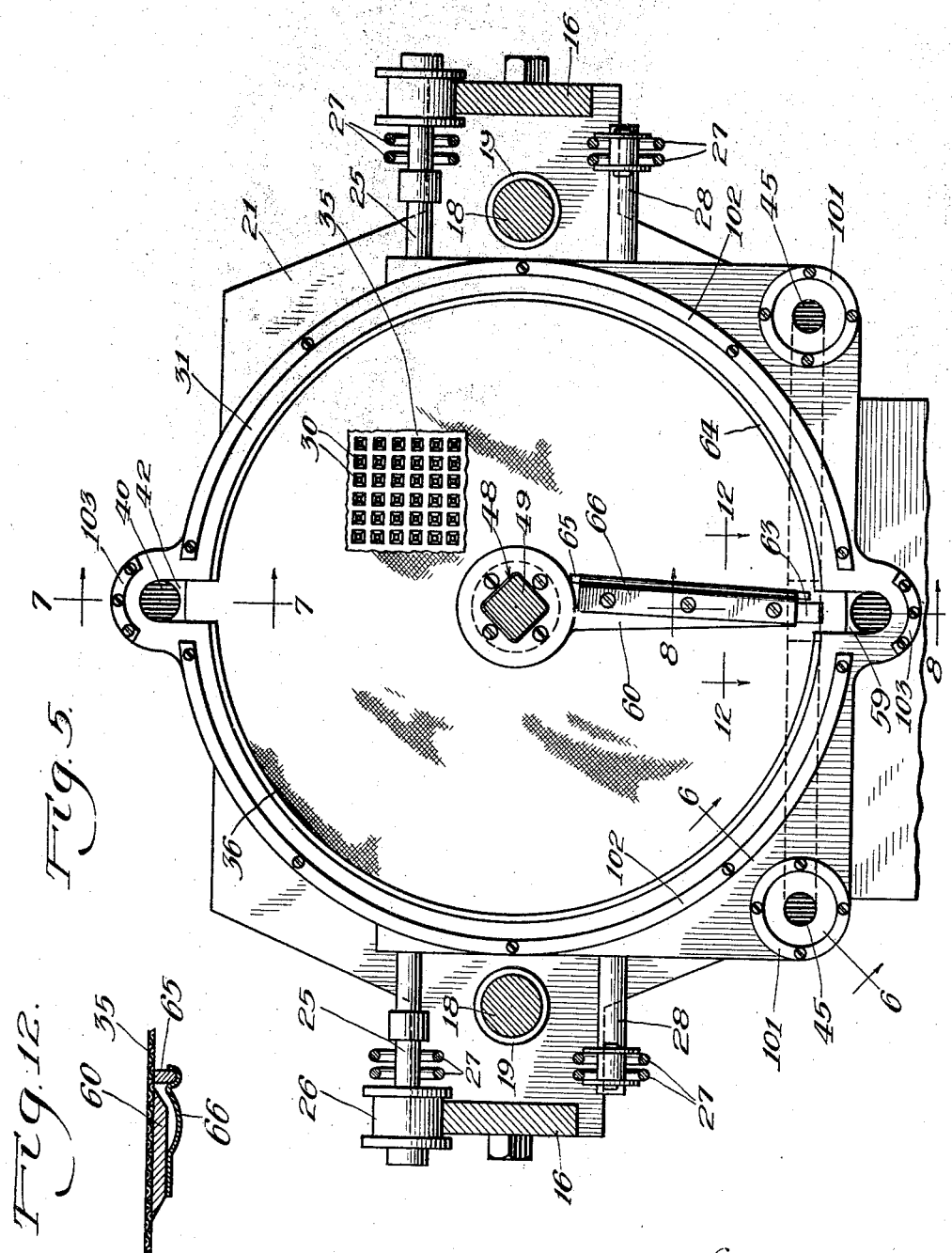

Nov. 29, 1932.       D. R. SPERRY       1,889,225
FILTER PRESS
Filed March 26, 1931       5 Sheets-Sheet 5
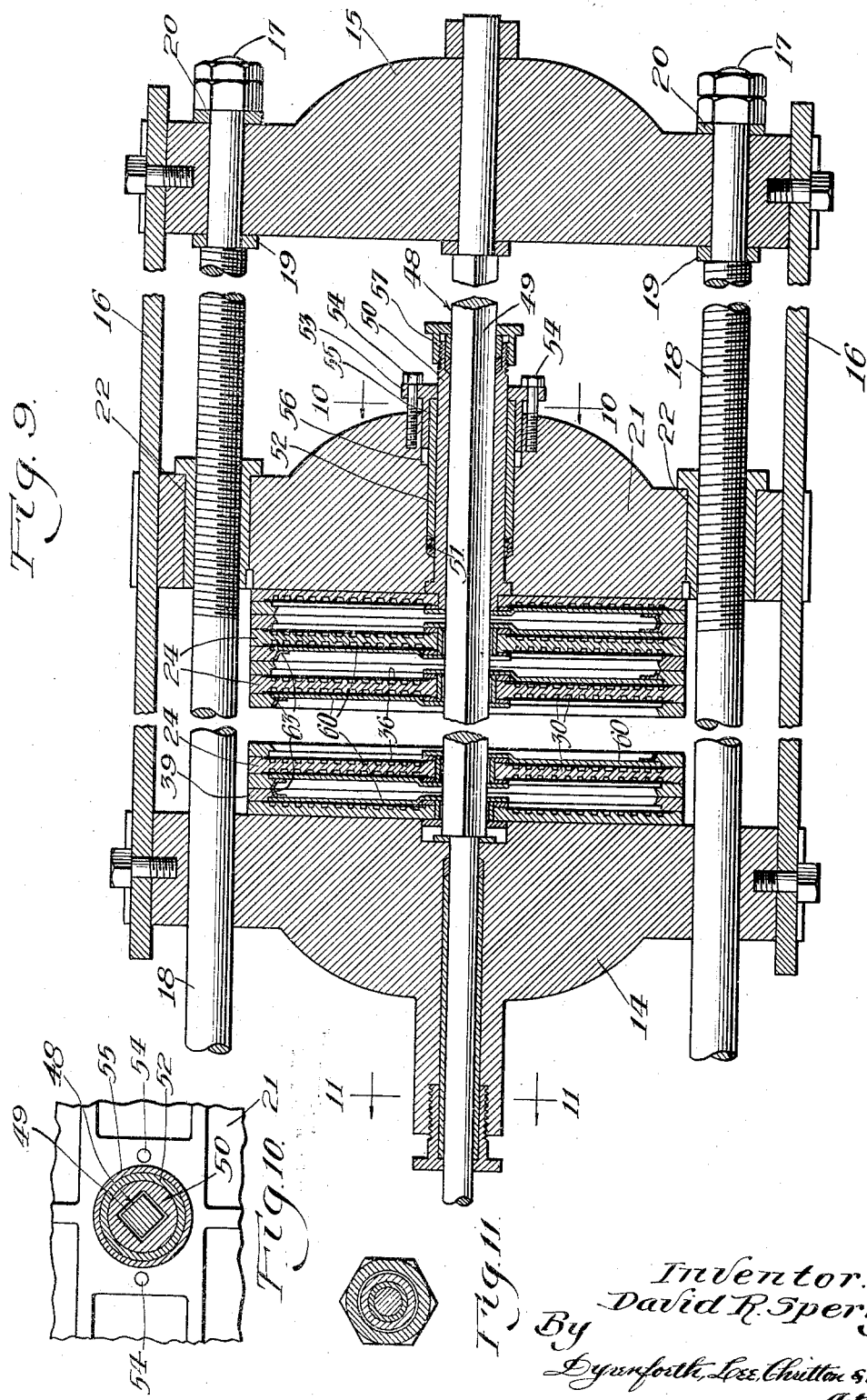
Inventor:
David R. Sperry,
By Dyrenforth, Lee, Chritton & Wiles
Attys.

Patented Nov. 29, 1932

1,889,225

UNITED STATES PATENT OFFICE

DAVID R. SPERRY, OF BATAVIA, ILLINOIS, ASSIGNOR TO D. R. SPERRY & CO., OF BATAVIA, ILLINOIS, A CORPORATION OF ILLINOIS

FILTER PRESS

Application filed March 26, 1931. Serial No. 525,546.

My object, generally stated, is to provide a novel and simple construction of filter press by which the cost for labor and time and expense required for the filtering of a given quantity of material shall be greatly reduced.

More specifically stated, certain of my objects are as follows:

To provide improvements in filter presses to the end that, whereas two operators are required to open and close a filter press of ordinary dimensions as hitherto constructed, a single operator only may open and close the press, and a single operator may handle a battery of several filter presses.

To provide improvements to the end that the time required to clean an entire filter press will be greatly reduced.

To provide improvements to the end that the press may be opened and closed mechanically thereby permitting the press to be opened and closed much quicker than in the case of filter presses required to be opened and closed by the manipulation of the devices for producing the clamping of the plates against each other and the manually successive movements of the filter plates one by one by hand labor.

To provide improvements to the end that the cakes removed from the plates may be delivered to mechanical means which operate to conduct the cakes to any desired point, thereby saving time and labor.

To provide improvements to the end that leakage of the liquid from the press will be prevented.

To provide improvements to the end that wear of the filter cloth will be reduced to the minimum thereby greatly reducing the expense of maintaining the filter press in operative condition.

To provide improvements to the end that the filter cakes may be mechanically, and preferably simultaneously, removed; and To provide improvements to the end that it shall be commercially practical to open the filter and remove the filter cakes before the latter become as thick as is necessary in the commercial operation of filter presses as hitherto provided, thus permitting of the constructing of the presses with narrower chambers than hitherto found necessary, with consequent saving in cost of equipment; providing for a higher average rate of flow of the liquid being filtered, and permitting of the use of high pressure in producing the thin cake resulting in the production of a drier cake in less time than in the case of presses operating with suction.

Referring to the accompanying drawings:

Figure 2 is a plan view of the press.

Figure 3 is an end view of the press.

Figure 4 is an enlarged broken view in side elevation of a plurality of the filter plates shown in the spaced apart position occupied by them when the press is opened.

Figure 5 is an enlarged sectional view taken at the line 5—5 on Fig. 2 and viewed in the direction of the arrows.

Figure 6 is an enlarged broken sectional view taken at the line 6—6 on Fig. 5 and viewed in the direction of the arrows.

Figure 7 is an enlarged broken sectional view taken at the line 7—7 on Fig. 5 and viewed in the direction of the arrows.

Figure 8 is an enlarged broken sectional view taken at the line 8—8 on Fig. 5 and viewed in the direction of the arrows.

Figure 9 is an enlarged broken sectional view taken at the line 9—9 on Fig. 1 and viewed in the direction of the arrows.

Figure 10 is a sectional view taken at the line 10—10 on Fig. 9 and viewed in the direction of the arrows.

Figure 11 is a sectional view taken at the line 11—11 on Fig. 9 and viewed in the direction of the arrows; and Figure 12, an enlarged broken sectional view taken at the line 12—12 on Fig. 5 and viewed in the direction of the arrows.

Figure 1:
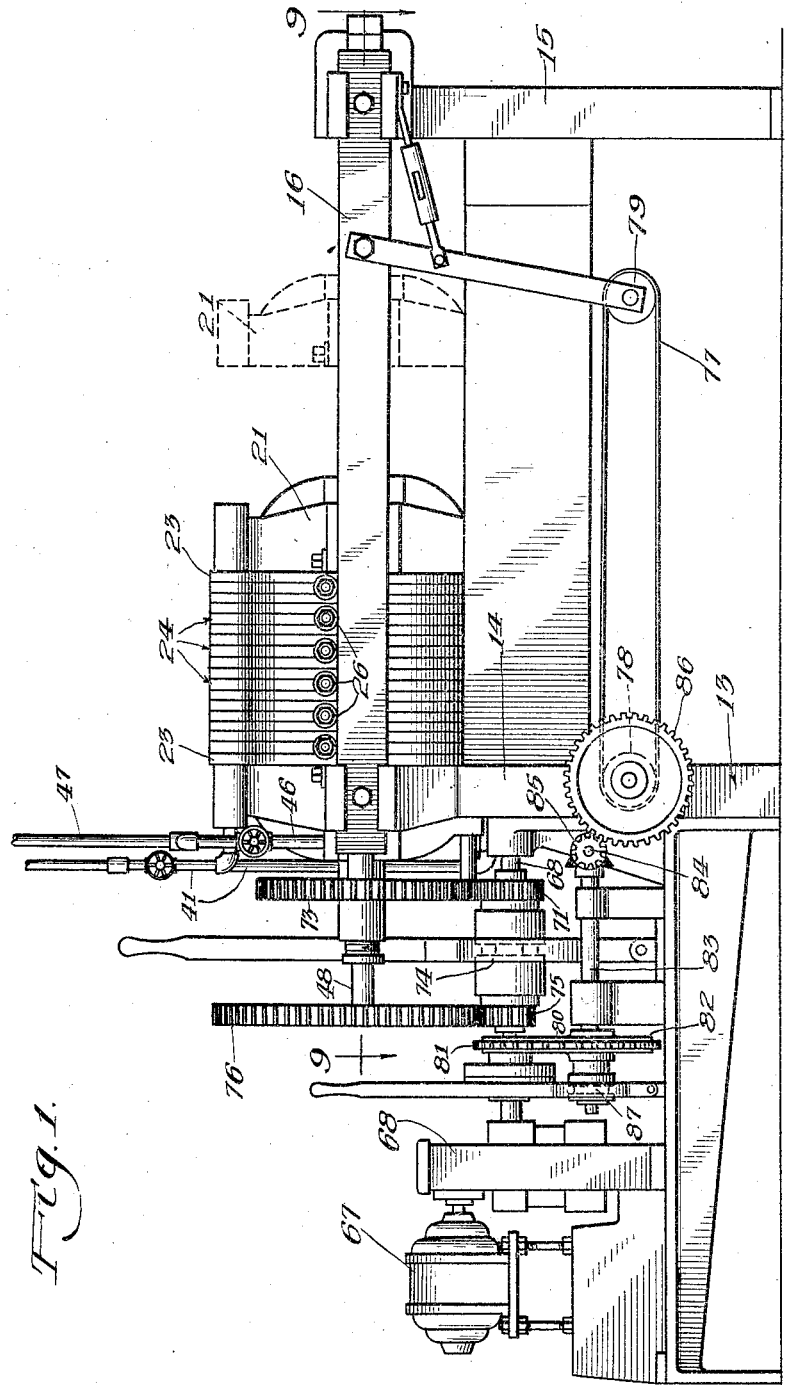
Figure 1 is a view in side elevation of a filter press embodying my invention.

Referring to the illustrated embodiment of my invention, the press comprises a stand 13 having an end upright 14 forming a fixed head, an upright 15 forming a tail-piece, and parallel bars 16 connecting together the head 14 and tail-piece 15.

Extending from the head 14 to the tail-piece 15 is a pair of parallel shafts 17 journaled at their ends in the head 14 and tail-piece 15 and threaded, as represented at 18, between these parts, these shafts being held against lengthwise movement by collars 19 and 20 secured thereto at opposite sides of the tail-piece 15.

Located between the head 14 and the tail-piece 15 is a head 21 through which the shafts 17 extend and with which they have threaded connection at nut-portions 22 of this head whereby upon rotating the shafts 17 the head 21 is moved toward or away from the head 14 depending on the direction in which the shafts are rotated.

Located between the heads 14 and 21 is a series of flatwise opposed filter plates the end ones of which are represented at 23 and the intermediate ones at 24, these plates being provided with handles 25 equipped with rollers 26, the rollers 26 resting on the bars 16 along which they are movable.

The plates 23 and 24 are connected together and the plates 23 connected with the adjacent heads 14 and 21, respectively, by means whereby when the head 21 is moved in a direction away from the head 14 to open the press, the various filter plates will become separated in succession by the pull exerted by the head 21, the particular means shown for this purpose comprising series of short chain sections 27 located above and below the shafts 17 at opposite sides of the press and connecting the head 14, filter plates, and movable head 21 together in succession through the medium of the handles 25 and other pins, represented at 28 on these several parts, the chain sections 27 being of such length that upon being drawn taut in the opening of the press, the filter plates will become spaced apart the desired distance for permitting the simultaneous removal of cake from all of the plates or for replacement of plates or the doing of such work as may be required on them.

The intermediate plates 24 are each formed of a platelike portion 29 having series of depressions 30 in its opposite faces, shown as of checker form, in accordance with the common practice of making filter plates.

Each plate 24 also comprises rings 31 and 32 opposing the peripheral marginal portions of the plate portion 29 at the opposite faces of the latter and held to the plate portion 29, with gaskets 33 and 34 interposed therebetween, by bolts, or the like, (not shown) extending through these parts.

Extending entirely across, and outwardly beyond, the areas of the plate 29 containing the depressions 30, are sheets 35 of filter cloth of metal or other suitable material, their marginal edges, which are lapped by the gaskets 33 and 34, extending into recesses 36 machined in the opposite faces of the plate portion 29, whereby the filter cloths 35 present a smooth, flat, filtering surface.

The end plates 23 are of the same construction as the plates 24 except that, instead of providing depressions on the opposite faces of the plate portions thereof and represented at 37 and forming the plate structure with two rings as described of the plate structures 24, depressions at one face only of the plate portion 37 and represented at 38 and a ring only at the inner face of the plate portion 37 and represented at 39, are provided, the areas containing the depressions 38 being covered with filter cloths as in the case of the plate structures 23 with their marginal edges interposed between the plate portions 37 and the rings 39, and lapped by a gasket as explained of the rings 23.

The plates 23 and 24 at their upper and lower edges contain openings 40 and 40ª extending crosswise therethrough which, when the press is closed, form continuous passages through the plates for the liquid to be filtered. The openings 40 and 40ª communicate with radial passages 42 and 42ª in the faces of the rings of which the parts 23 and 24 are composed, the passages 42 and 42ª opening into the chambers provided between adjacent ones of the filter cloths, the opposite side walls of which are formed of the filter cloths referred to.

The passages 40 and 40ª are connected with piping represented at 41 and suitably valved as shown to permit the liquid to be filtered to flow into either the passage 40 or 40ª as desired.

The plate portions 23 and 24 contain, at their lower edges, transverse openings 43 which communicate with the depressions on the faces of the plate portions 29 and 38, these plate portions being also provided with passages 44 in their lower edges extending in opposite directions and opening, respectively, into conduits 45 at opposite sides of the press and formed by openings which extend crosswise of the plates 23 and 24, these openings registering and forming continuous passages at opposite sides of the press when the press is closed. The passages 45 into which the filtered liquid flows from the plates 23 and 24 and from which it flows out of the press are shown as connected with pipes 46 which open into a pipe 47 through which the filtered liquid is conducted to the point of disposal.

To ensure tight joints between the plates 24 and between the latter and the plates 23 in the closed condition of the press, gaskets 100 are provided at these joints, these gaskets being held in place by rings 101 surrounding the openings 45, arc-shaped strips 102 extending from points adjacent the openings 40ª to points adjacent the openings 40; and arc-shaped strips 103 extending above and below, respectively, the openings 40 and 40ª, the rings 101 and strips 102 and 103 being secured to the adjacent one of the filter plates by screws as shown.

Extending through the central portions of the filter plates 23 and 24 and head 21 and journalled in the head 14 and the tail piece 15 is a shaft 48 which is square in cross section, as represented at 49, at the portion thereof which extends between the head 14 and the tail piece 15, the openings in the filter plates through which the square portion 49 of the shaft 48 extends being round so that the shaft may be rotated therein. As the joint between the square portion 49 of the shaft and the sliding head 21 should be liquid tight, the shaft 49 is provided at its square portion with a cylindrical bushing 50 having a square opening therethrough at which it fits the square portion of the shaft.

Packing is interposed between the bushing 50 and the opening in the movable head 21 and is held in the desired compressed condition by a sleeve 52 surrounding the bushing and pressed against the packing by a follower 53 surrounding the bushing and bearing against the outer end of the sleve 52. The follower 53 is connected with the movable head 51 by screws 54 extending through the follower and screwing into the head, the follower 53 being provided with a tubular extension 55 surrounding the outer end of the sleeve 52 and slidable in an annular space 56 between this sleeve and the wall of the opening in the movable head 21. A stuffing box 57 surrounding the squared portion of the shaft seals the joint between the outer end of the bushing 50 and the shaft.

Mounted on the square portion 49 of the shaft 48 to rotate therewith are stripper bars 60 positioned in close proximity to the several filter cloths referred to, the outer ends of these bars extending into, and being movable in, inwardly-opening annular channels 61 in the rings 31 and 32, and being provided with rings 62 having outwardly deflected portions 63 lapping, and slidable along, chamfered surfaces 64 of the rings comprising the plates 23 and 24. The trailing edges of the bars 60 are provided with strips 65 of wicking, felt, or other suitable material, or with brushes, shown as supported on the bars by spring-metal strips 66 which press the wiper strips 65 against the faces of the filter cloths and function as hereinafter described.

Means for moving the head 21 toward and away from the head 14 to close and open the press, respectively, and means for rotating the shaft 48 to actuate the bars 60, are provided.

The means for moving the head 21 comprise a reversible power-device 67, shown as an electric motor, the rotor of which is connected, through gear reduction-mechanism 68, with a shaft 69 having a pinion 70 journalled therein and meshing with a gear 71 on a jack shaft 72, the gear 71 meshing with gears 73 secured to the ends of the shafts 18, a double acting clutch 74 on the shaft 69 controlling the driving of the pinion 70.

The means for rotating the shaft 48 comprise a pinion 75 journalled on the shaft 69 and meshing with a gear 76 supported on a jack-shaft 77 and connected with the shaft 48, the driving of the pinion 75 being controlled by the clutch 74.

The opening and closing of the press, as will be understood from the foregoing description is effected by the shifting of the movable head 21 away from and toward, respectively, the fixed head 14.

Assuming the press to be in the closed position shown, to open it the operator throws the clutch 74 in one direction to clutch the pinion 70 to the shaft 69 whereupon the shafts 18 are rotated in a direction to slide the head 21 in a direction away from the fixed head 14, the chain connection between the filter plates 23 and 24 and between the plates 23 and heads 21 and 14 operating to cause the head 21 and plates to assume the spread, or spaced relation, shown of adjacent plates in Fig. 4, the spacing of these parts being determined by the length of the chains. The press thus opened renders the filter plates exposed for removal of the cakes formed thereon or for repair or renewal. The closing of the press is effected by reversing the motor which rotates the shafts 18 in a direction for sliding the head 21 toward the head 14 to the full-line position shown in Fig. 2 the chains assuming slack condition.

The stripper bars 60 afford means for removing all of the cakes simultaneously from the filter cloths, these bars, after the press has been opened as stated, being caused to rotate across the outer faces of the filter cloths by the throwing of the clutch 74 in the direction opposite that to which it is moved to clutch the pinion 70 to the shaft 69. Thus actuating the clutch engages the pinion 75 with the shaft 69 and through the gear 76 rotates the shaft 48.

The cakes thus separated from the filter plates may be removed from the press in any desired way. In the construction shown a conveyor located below the filter plates is provided for this purpose. This conveyor, shown in the form of an endless belt 77 supported on pulleys 78 and 79, is driven from the motor 67 by a sprocket chain 80 engaging sprockets 81 and 82 on the shaft 69 and a shaft 83, respectively, the shaft 83 being geared to a cross-shaft 84 having a pinion 85 meshing with a gear 86 operatively connected with the pulley 78. The sprocket 82 is journalled on shaft 83 and the driving thereof is controlled by a clutch represented at 87.

The strips 65 serve as a means for cleaning the filter cloths. Thus when the chambers between adjacent filter cloths are filled with water, solvent or other suitable liquid and the bars 60 are rotated, the exposed surfaces of the filter cloths are wiped clean.

The stripper bars 60, with their wiper strips, may also be used for removing a pre-coat or other thin layer upon the filter plates by causing the bars to rotate without separating the plates, the solids thus separated from the plates being flushed out by introducing flushing fluid into either the passage 40 or 40ª and permitting it to discharge from the other of these passages. A new pre-coat or a new run may thus be started without opening the filter press.

The ease and rapidity with which the press may be opened, closed and cleaned renders it highly commercially feasible to operate it on each run only a sufficient length of time to form cakes relatively thin as compared with filter presses of the pressure type as hitherto provided. Thus a higher average rate of flow of the liquid through the filter cloths, with manifest advantage, may be obtained; and the press may be provided of more compact form and of less expensive construction. Furthermore, as is highly desirable, the apparatus produces, by high pressure filtration, a relatively thin dry cake.

Another advantage is that the cost for labor and the time and other expenses involved to filter a given quantity of material is greatly reduced as compared with filter presses as hitherto provided. The time usually required for opening, cleaning and closing filter presses as hitherto constructed, varies from one-half to one hour of two men's time, whereas, in the use of my improved construction only about one-quarter hour of one man's time is required to perform the operations stated.

It will be noted that the filter cloths do not extend, as gaskets, into the joints between the plates, but are set into machined recesses in which they lie flat permitting the stripper bars 60 to be adjusted so that they scarcely touch the filter cloths, whereby wear and tear of the filter cloths requiring repairs or replacement are reduced to the minimum. Furthermore, this feature of my construction prevents capillary flow of liquid from the interior of the chambers to the outside of the press through the filter cloths.

While I have illustrated and described a particular construction embodying my invention, I do not wish to be understood as intending to limit it thereto as the same may be variously modified and altered without departing from the spirit of my invention, and in this connection it may be stated that, while the press is shown as formed of a relatively small number of filter plates, this small number of plates being shown to simplify the drawings, in practice, many times the number shown would ordinarily be used.

What I claim as new, and desire to secure by Letters Patent, is:

1. A filter press comprising filter plates having filter cloths, rotatably mounted stripper members for removing the deposit on the filter cloths, and guide portions at the outer ends of said members and engaging portions of said filter plates for guidance.

2. A filter press comprising filter plates having filter cloths, portions of said plates extending outwardly beyond the plane of said cloths adjacent the outer margins of the latter and presenting inner circumferential portions, and rotatably mounted stripper members for removing the deposit on the filter cloths, the outer ends of said members guidingly engaging the inner circumferential margins of said portions of the plates.

DAVID R. SPERRY.